Oct. 5, 1971   R. I. WINE   3,609,927
ARCHITECTURAL MOLDING STRIPS
Filed June 27, 1969
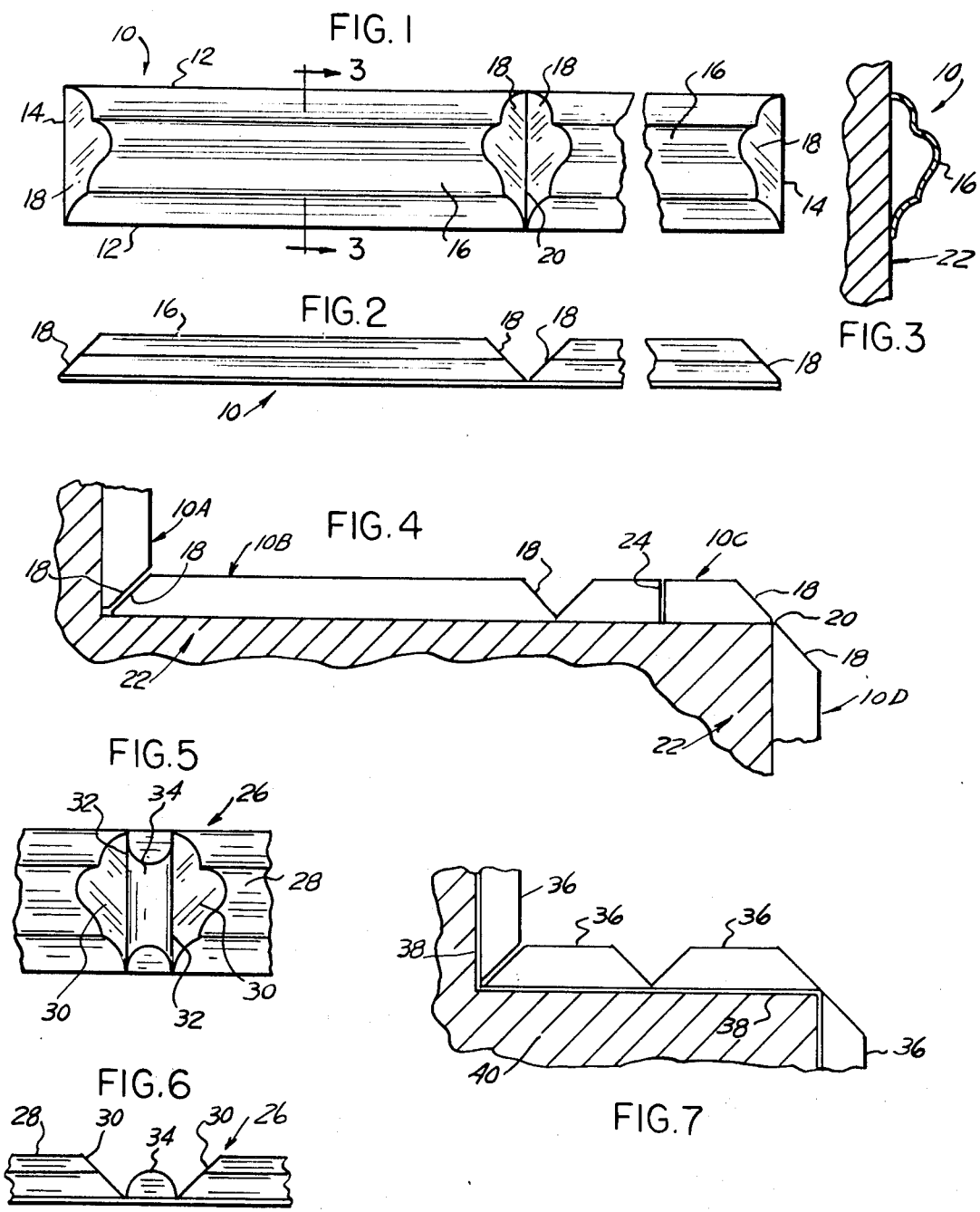
INVENTOR
ROBERT I. WINE
BY Cullen, Sloman, & Cantor
ATTORNEYS

United States Patent Office 3,609,927
Patented Oct. 5, 1971

3,609,927
ARCHITECTURAL MOLDING STRIPS
Robert I. Wine, 303 Greenwood,
Birmingham, Mich. 48009
Filed June 27, 1969, Ser. No. 837,049
Int. Cl. E04f *19/04*
U.S. Cl. 52—100         1 Claim

ABSTRACT OF THE DISCLOSURE

A decorative thin-wall moulding strip is provided with transverse notches at regular intervals along its length, each notch having 45° beveled surfaces. To carry the moulding around an inside or outside corner, the strip is severed at a notch, and the severed ends abutted at the corner. If the material permits, bending rather than severing at the notch is possible. A first modification has a supplementary contour at the notch, which is removed to form a corner. A second modification comprises a series of beveled blocks bonded to a flexible elongated backing sheet, so that a corner is formed at the point where two blocks meet simply by bending the backing sheet around the corner.

BACKGROUND OF INVENTION

This invention is concerned with eliminating the need for making precise miter joints in architectural wall moldings when forming 90° inside or outside corners. At best, the making of an acceptable joint requires skill and precision to prevent gaps or misalignments at the intersection. This is especially true where the molding is fabricated of a contoured thin-walled section, wherein the thin-wall construction makes mitering extremely difficult.

The novel solution described below permits 90° inside or outside corners to be formed with ease, even where the molding is fabricated of a non-rigid thin-walled material such as plastic. These and other advantages of this invention will become apparent from the following description.

BRIEF DESCRIPTION OF THE DRAWINGS

FIG. 1 is a front elevation of a portion of a thin wall molding formed in accordance with this invention.

FIG. 2 is an edge view of the molding of FIG. 1.

FIG. 3 is a transverse cross-section of the molding of FIG. 1 viewed in the direction of arrows 3—3 of FIG. 1.

FIG. 4 is a plan view through a portion of a wall having both an inside and outside corner, and showing the manner in which the molding of this invention is carried around a corner. The wall is shown in section, while the molding is not.

FIG. 5 is a front view of a portion of a first modification of the molding of this invention.

FIG. 6 is an edge view of the molding of FIG. 5.

FIG. 7 is a plan view in section of a portion of wall to which a second form of modified molding has been applied.

DETAILED DESCRIPTION OF THE INVENTION

Referring to FIGS. 1–3 of the drawings, there is illustrated a portion of a strip of molding 10 made in accordance with this invention. Molding 10 comprises upper and lower longitudinal edges 12, transverse end edges 14 and a contoured front face 16.

Each end of molding strip 10 is provided with a beveled notch face 18 which lies at a 45° angle to the plane defined by the longitudinal and end edges 12 and 14. Spaced at regular intervals along the length of molding strip 10 is a series of transverse notch lines 20 (only one of which is shown) preferably substantially coplanar with edges 12 and 14, and from which further notch faces 18 extend upwardly and outwardly in opposite directions at 45° angles.

Molding strip 10 is fabricated of a thin wall section, as is illustrated in the section shown in FIG. 3, wherein the molding is shown in position against wall 22. Such a thin wall molding may be preferably formed of plastic or metal by vacuum forming, rolling, casting, injection molding or stamping, depending upon the material and whether uniform wall thickness is desired. Variable wall thickness may be desirable for increased strength or to facilitate fastening the molding to the supporting wall.

Notch lines 20 may be spaced at any desired interval, such as four to twelve inches, while the overall length of molding strip 10 could be three to eight feet. Such dimensions are not significant, the novel concept and manner of use being independent of the particular dimensions used.

Referring to FIG. 4 of the drawings, a typical molding strip installation on a wall having both inside and outside corners is illustrated. To form a corner, it is only necessary to make a single transverse saw cut along one of notch lines 20. In the left portion of the figure, it can be seen how the notch faces 18 of adjacent segments of the molding strip 10A and 10B cooperate to form an inside corner without the need for mitering the joint. Similarly, at the extreme right portion of the figure, the manner in which notch lines 20 of adjacent segments 10C and 10D abut to form an outside corner is illustrated. Depending upon the material used, it might even be possible to form inside or outside corners by simply bending the strip at a notch line 20.

Thus, the notches not only simplify the corner problem, but also provide flat straight line edge 14 for easy and accurate alignment of adjacent sections of strip.

Where, as in FIG. 4, the wall span between corners is such that a corner does not fall exactly at one of the notches, the strip may be cut at any point along its length to form a butt joint as at 24.

Molding strip 10 can be secured to a wall by a variety of means. Where the cross-sectional contour includes some flat portions in face to face contact with the wall, a double faced adhesive tape could be secured to the rear of such portion. Alternatively, a flat portion could serve as a nailing strip. Still another possibility, where no flat flange exists, is to employ short supplemental blocks having an identical sectional contour and coated with adhesive. Such blocks would be spaced at intervals along the wall and the strip laid over them.

A modification of the invention is illustrated in FIGS. 5 and 6 of the drawings, wherein molding strip 26 is identical to strip 10 of FIGS. 1–3, except for the configuration at the intermediate notches. The end portions of strip 26 are therefore not illustrated. Strip 26 is provided with a front contoured face 28 and with 45° angle beveled notch faces 30. However, rather than the notch faces slopping downwardly to a single transverse notch line, as at 20 in the previously described form, in the embodiment of FIGS. 5 and 6 notch faces 30 intersect a pair of spaced parallel transverse notch lines 32. Between these notch lines there is a supplementary contoured portion 34.

In use, when it is desired to cut the molding to form a corner, two transverse cuts are made along each of the notch lines 32, thereby removing the intermediate supplemental contoured portion 34. The molding is then installed at a corner in the same fashion as that of FIGS. 1–4. Hence, the concept is the same, but an alternative form of notch contour is provided.

A still further modification of the invention is illustrated in FIG. 7. Here, the molding comprises a series of identical but separate blocks 36 which are abutted end to end and bonded to an elongated flexible backing sheet 38. Blocks 36 can be wood or plastic foam, or they could also be of thin wall construction. Any form of block contour could be utilized, it being only necessary that the ends be prebeveled as shown.

It can be seen that the beveled end portions of blocks 36 permit either inside or outside corners of wall 40 to be negotiated merely by wrapping backing sheet 38 around the corner, the backing sheet being flexible to permit the assembly to bend. Backing sheet 38 could be coated with adhesive on its rear face, thus facilitating fastening to the wall.

This invention may be further developed within the scope of the following claim. Accordingly, the above specification is to be interpreted as illustrative of only three operative embodiments of this invention, rather than in a strictly limited sense.

I now claim:

1. An elongated thin-walled decorative architectural wall molding strip comprising:

top and bottom longitudinal edges and transverse end edges at right angles thereto, all of said edges being coplanar and adapted to lie flush against a supporting wall surface;

said molding being provided with a decorative front surface which is deeply contoured throughout a substantial portion of the transverse width of said molding between said top and bottom longitudinal edges, and having a uniform transverse cross-section along the length of each molding;

each of the ends of the molding strip having a beveled surface which projects outwardly at a 45° acute angle to the plane of the molding edges and extends across the full transvesre width of said molding from said transverse end edge to the contoured front face;

said molding being further provided with a series of transverse notches which interrupt said contoured front surface at regular intervals along its length, each of said notches comprising a pair of parallel spaced transverse lines defining the bottom of the notch parallel to and coplanar with said end edges, the space between said pair of transverse lines of each pair being provided with a supplementary contoured surface, each of said transverse lines being the line of intersection of one edge of said supplementary contoured surface with a beveled surface projecting outwardly at a 45° angle to the plane of the molding edges and extending across the full transverse width of said molding from said line of intersection to the contoured front surface, each of said notch beveled surfaces being substantially identical to said end beveled surface;

whereby a 90° inside or outside wall corner can be formed with said molding by severing said molding strip along each of both transverse notch lines of a given notch so as to remove said supplementary contour surface of said given notch and abutting at the corner said end edges of said transverse notch lines of two adjacent strips.

References Cited

UNITED STATES PATENTS

| | | | |
|---|---|---|---|
| 1,867,449 | 7/1932 | Ecket et al. | 52—100 |
| 2,483,560 | 10/1949 | Peterson | 52—99 |
| 3,200,547 | 8/1965 | Johnson | 52—288 |
| 3,201,910 | 8/1965 | Keesee | 52—287 |
| 3,411,257 | 11/1968 | Yaremchuk | 52—105 X |
| 3,444,657 | 5/1969 | Swanson | 52—288 |
| 3,475,871 | 11/1969 | Saunders et al. | 52—716 X |

PRICE C. FAW, JR., Primary Examiner

U.S. Cl. X.R.

52—105, 287, 631, 716